United States Patent
Watkins

(10) Patent No.: US 11,030,883 B1
(45) Date of Patent: Jun. 8, 2021

(54) RTC PROTECH

(71) Applicant: Maria Watkins, Birmingham, AL (US)

(72) Inventor: Maria Watkins, Birmingham, AL (US)

( * ) Notice: Subject to any disclaimer, the term of this patent is extended or adjusted under 35 U.S.C. 154(b) by 0 days.

(21) Appl. No.: 16/789,656

(22) Filed: Feb. 13, 2020

(51) Int. Cl.
| | |
|---|---|
| *H04W 76/50* | (2018.01) |
| *H04W 76/40* | (2018.01) |
| *H04W 4/02* | (2018.01) |
| *H04W 4/029* | (2018.01) |
| *H04W 84/18* | (2009.01) |
| *H04W 48/04* | (2009.01) |
| *G08B 25/01* | (2006.01) |
| *G08B 25/10* | (2006.01) |
| *H04W 4/90* | (2018.01) |

(52) U.S. Cl.
CPC ........... *G08B 25/016* (2013.01); *G08B 25/10* (2013.01); *H04W 4/025* (2013.01); *H04W 4/90* (2018.02)

(58) Field of Classification Search
CPC ....... H04W 4/90; H04W 76/50; H04W 4/029; H04W 4/38; H04W 84/18; H04W 4/23; H04W 4/02; H04W 4/70; H04W 4/06; H04W 76/40; H04W 48/04
USPC ........... 455/456.1, 456.3, 414.1; 340/539.22, 340/539.12, 870.02; 370/389, 338, 334, 370/254, 352, 311, 252
See application file for complete search history.

(56) References Cited

U.S. PATENT DOCUMENTS

| | | | | |
|---|---|---|---|---|
| 8,068,463 B2 * | 11/2011 | Chen | ...................... | H04W 76/50 370/334 |
| 8,107,397 B1 * | 1/2012 | Bagchi | .................. | H04L 9/0833 370/254 |
| 8,395,498 B2 * | 3/2013 | Gaskill | .................. | A61B 5/747 340/539.12 |
| 8,406,162 B2 * | 3/2013 | Haupt | ................... | H04W 4/029 370/311 |
| 8,412,231 B1 * | 4/2013 | White | ................... | H04W 76/40 455/456.1 |
| 8,515,547 B2 * | 8/2013 | Mass | ...................... | G08B 21/02 607/60 |

(Continued)

FOREIGN PATENT DOCUMENTS

CN 104380349 A * 2/2015

OTHER PUBLICATIONS

IoT Device for Vehicle Analytics and Smart Actions by IP.COM Sep. 2018 (Year: 2018).*

*Primary Examiner* — William D Cumming
(74) *Attorney, Agent, or Firm* — Ronald D. Baker, Esq.; Baker & Co. Patent Law Consultant.

(57) ABSTRACT

A system for alerting emergency contacts includes a data collecting computer comprising a processor and software. The processor is configured to connect to a communication system; submit data to a contact; and receive data from mobile devices. The mobile devices transmit data. If the data collecting computer receives distress data from the mobile device, the data collecting computer communicates to a first communication device. The processor is configured to communicate, via the communication system, to a first communication device; and submit data to the first communication device. The processor is configured to capture images of an officer by utilizing artificial intelligence when prompted by the user. The artificial intelligence uses facial recognition to recognize face of the officer. The processor is configured to determine speed, distance and location of a vehicle for a report purpose.

7 Claims, 3 Drawing Sheets

(56) References Cited

U.S. PATENT DOCUMENTS

| | | | |
|---|---|---|---|
| 8,570,994 B2* | 10/2013 | Chen | H04W 76/50 370/338 |
| 8,587,427 B2* | 11/2013 | LaLonde | G08B 21/02 340/539.12 |
| 8,711,732 B2* | 4/2014 | Johnson | H04W 4/90 370/259 |
| 8,811,188 B1* | 8/2014 | Bagchi | H04L 9/0822 370/241 |
| 8,818,522 B2* | 8/2014 | Mass | G08B 21/02 607/60 |
| 8,855,683 B1* | 10/2014 | White | G08B 27/006 455/456.3 |
| 8,970,392 B2* | 3/2015 | LaLonde | A61B 5/0026 340/870.01 |
| 9,026,148 B1* | 5/2015 | White | H04W 4/021 455/456.3 |
| 9,137,644 B1* | 9/2015 | White | G08B 27/006 |
| 9,269,251 B2* | 2/2016 | LaLonde | A61B 5/0026 |
| 9,277,358 B1* | 3/2016 | White | G08B 27/006 |
| 9,544,731 B1* | 1/2017 | White | H04W 4/70 |
| 9,756,470 B1* | 9/2017 | White | G08B 27/00 |
| 9,986,384 B1* | 5/2018 | White | H04W 4/90 |
| 9,986,404 B2* | 5/2018 | Mehta | H04W 76/50 |
| 10,149,105 B1* | 12/2018 | White | G08B 27/00 |
| 2007/0124144 A1* | 5/2007 | Johnson | H04L 69/40 704/246 |
| 2008/0001735 A1* | 1/2008 | Tran | A61B 5/7264 340/539.22 |
| 2009/0224889 A1* | 9/2009 | Aggarwal | H04L 63/08 340/10.4 |
| 2009/0310608 A1* | 12/2009 | Chen | H04W 76/50 370/389 |
| 2009/0316671 A1* | 12/2009 | Rolf | H04W 4/02 370/338 |
| 2012/0093015 A1* | 4/2012 | Chen | H04W 84/18 370/252 |
| 2013/0150004 A1* | 6/2013 | Rosen | H04W 48/04 455/414.1 |
| 2013/0154851 A1* | 6/2013 | Gaskill | G16H 40/67 340/870.02 |
| 2013/0310896 A1* | 11/2013 | Mass | G16H 40/67 607/60 |
| 2014/0003348 A1* | 1/2014 | Velev | H04W 60/06 370/328 |
| 2015/0054639 A1* | 2/2015 | Rosen | H04M 3/2281 340/439 |
| 2015/0079921 A1* | 3/2015 | Johnson | H04W 4/90 455/404.1 |
| 2016/0073254 A1* | 3/2016 | Rosen | H04W 4/16 455/414.1 |
| 2016/0140404 A1* | 5/2016 | Rosen | H04W 4/027 455/456.3 |
| 2016/0142879 A1* | 5/2016 | Walden | H04W 4/50 455/456.3 |
| 2017/0251347 A1* | 8/2017 | Mehta | H04W 4/90 |
| 2018/0249315 A1* | 8/2018 | Mehta | H04W 4/029 |

* cited by examiner

RTC PROTECH

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Generally, when law enforcement detains a person for questioning or arrest, the detained individual is at the mercy of the officers depending on the circumstances. On average, in the United States, a police officer takes the life of a citizen every 7 hours. 61% of police officers state that they do not always report serious abuse that has been directly observed by fellow officers. People who are African-American are twice as likely to be killed by a police officer while being unarmed compared to a Caucasian individual According to the US Department of Justice, 69% of the victims of police brutality in the United States who are African-American were suspected of a non-violent crime and were unarmed.

In recent years, the United States has seen a staggering number of incidents where African Americans were disproportionately assaulted by law enforcement and in other high-profile cases were even murdered. News surrounding these events have frightened many African American families with no real solutions. In fact, young African American males appear to be the main targets for such crimes. Considering the fact that whites make up 62 percent of the population and blacks make up only 13 percent of the population; the reality versus the total population percentages is baffling. To elaborate, an F.B.I. supplementary homicide report indicates that 31.8 percent of people shot by the police are African-American; this proportion is more than two and a half time the total population of 13 percent in which African-American represent; similar to the disproportionate numbers in our prisons. The data reveals that African-Americans are being killed disproportionately by police at an alarming margin. Alternatively, other nationalities encounter a far less percentage of similar cases involving assaults at the hands of police. News involving such crimes perpetrated by law enforcement has resulted in tension in the streets during those times where African-Americans are pulled over by police.

The current invention will provide individuals a sense of security by being able to send critical information and contacting important individuals before things escalate. Following an arrest, a person has the right to remain silent until they retain the services of an attorney but all too often individuals under similar circumstances will call friends and or family members without contacting an attorney and make damaging statements in the presence of the officers. The proposed invention gives individuals the option to activate a mobile device for purposes of contacting an attorney as well as send important data that will help protect an otherwise innocent person against harassment, intimidation, brutality, and death.

In 2017 during a traffic stop in Atlanta, Ga. a young male was stomped in the head by a police officer after being handcuffed because he was arguing with one of the officers. Yet in another instance, during the same year cops in Chicago took gang members to rival territory to get them to confess. Other cases are too disturbing for families to bare such as the case of Tamir Rice, a twelve-year old boy who was fatally shot in 2014 by a police officer in Cleveland. Furthermore, in Alpharetta, Ga. an elderly grandmother was assaulted by a police officer and thrown against her own vehicle when she simply asked to speak with a supervisor while being pulled over for "failure to maintain a lane". In all of these cases, it was found that law enforcement violated individual rights; if the victims were able to immediately contact the right attorney or other designated contacts then possibly these stories would have turned out differently. It is no secret that most people are nervous or simply not thinking straight when faced with such unfortunate circumstances. The public is eager to welcome a method that would allow them to be prepared for such an event by being able to discreetly contact a designated contact such as an attorney during these unfortunate times.

BRIEF SUMMARY

The proposed invention will serve a broader use for mobile devices that incorporates the transmission of information for the prevention, intervention, and legal assistance in order to prevent police harassment, intimidation, brutality, and death in a way that have not been previously utilized. The RTC Protech can perform a host of emergency functions for a user to immediately send messages or even record both audio and video when prompted to do so. By utilizing data attributable to a user's surrounding, mobile devices will help send critical messages and help prevent harm to individuals who have been stopped by law enforcement. There have been a significant number of occurrences involving law enforcement where individuals have been either murdered, severely injured, or humiliated by a corrupt officer. The proposed invention will solve a number of important issues when an individual is detained such as immediately contact an attorney, record events as they are happening, and document the time and date of the event.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
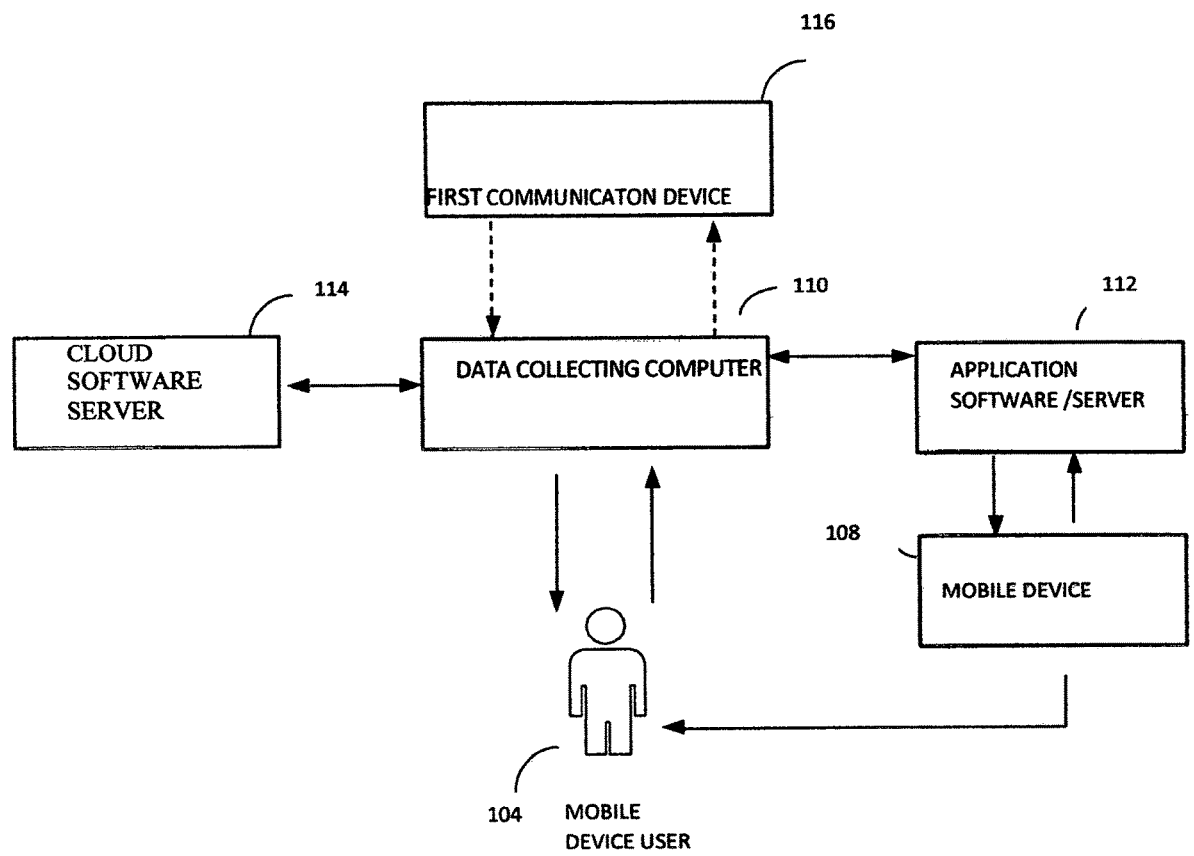
FIG. 1 is a system diagram for an exemplary system configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a mobile device refers to a variety of components that operates using any means of Internet connection or similar means for transmitting packets of data that allow smart devices (such as phones, badges, wearable devices, tablets, computers, handheld devices, game devices, etc.) to be updated when they receive data. The ability of a mobile device to collect such data packets based on a person's circumstances and environment is important when compiling critical information to relay to the end user.

Reference throughout this document to communication system refers to a variety of components and networks that operates the RTC Protech system by using various communication devices to transmit data packets of audio that allow smart devices (such as phones, tablets, computers, handheld devices, game devices, etc.) to communicate with the RTC Protech system for proper operation of the proposed invention.

Reference throughout this document to first communication device refers to a variety of services and devices that a user would communicate with utilizing the mobile device to operate the RTC Protech system (such as 911 dispatch, wireless devices such as BLUETOOTH™, Cloud servers etc.) for proper operation of the proposed invention.

Reference throughout this document to chirping refers to an audible sound that the user's mobile device will initiate once the RTC Protech system has been activated upon being pulled over by an officer. The chirping sound will sound every 30 seconds. The chirping will be followed with an audible announcement by the system that the officer is now being monitored by RTC Protech.

The RTC Protech system is organized to allow the user to list designated attorneys and other selected members to be placed on a network service list. This list is chosen by the user and will be managed by the user and additional contacts can be included. The RTC Protech system will arrange pre-determined hourly rates to the attorneys that are chosen by the user in the event the attorneys are contacted to represent the users of the RTC Protech system.

The RTC Protech application utilizes a mobile device or similarly known transmission method for communicating data. A data collecting computer will act as the system's central control unit by utilizing a processor and software to collect and integrate data for the proper operation of the overall communication system. As an example, the mobile device is in constant contact with the RTC Protech application software system at all times; users may alert certain family members and contracted attorneys in the event they feel that they are in danger due to a traffic stop. It is important to note that the present invention can be activated by voice commands or the user touching a single application on the mobile device thus transmitting information such as video, audio, and GPS simultaneously to designated contacts. The software system installed on the mobile device will activate and record certain data when prompted by the user. In a non-limiting example, the software system will take images of the officer utilizing artificial intelligence technology in the event such information is required where a police officer's body camera has been turned off. The system's artificial intelligence feature will utilize facial recognition in a way that derives from a data mining technology. This imaging service is critical where a user has elected an attorney to receive data for purposes of discovery or other similar stages in the legal process if indeed a suit is filed. Connecting with the software application stored on a mobile device is a reliable method to ensure that all collected data associated to the incident is stored and may be recalled at the user's convenience. Such data can be utilized by the data collecting computer to accurately determine the speed of the vehicle when the officer stopped as well as the location of the vehicle at various time intervals. This is critical because if needed an attorney for instance may utilize this information to compare to what an officer's report of the incident states. Once the system is initiated the designated contact will be alerted via mobile device and all of the data in an instance will be transmitted for emergency purposes. Additionally, when prompted after an officer has pulled over the user's vehicle, the RTC Protech system will initiate a series of chirping sounds that will repeat every 30 seconds followed with an audible alert from the mobile device that the officer is being monitored by RTC Protech. This type of alerts has proven to be effective at deescalating violence due to the communication to the officer that their actions are being monitored and recorded. The data maybe saved to a cloud-based service or similar means such as Microsoft cloud service for analytical purposes. Any mobile device that the user decides to configure will have the capability to collect and transmit recorded data. In a non-limiting example, the application installed on the mobile device may even face-time with a contact if necessary. Information is constantly compiled for each device through use of the software application on the desired mobile device.

Utilizing such data as GPS information and time etc. provides highly accurate data for mobile device users to record dangerous encounters. The more data collected from the surrounding conditions the more information will be transmitted to designated contacts selected by the user. The RTC Protech application may even compile GPS data to ensure that the user can be easily located by all designated contacts. In an exemplary embodiment, the use of GPS data and location points will be simultaneously transmitted to a first communication device for purposes of communicating with critical contacts when the RTC Protech application is activated by the user.

The confluence of time, location, video, and audio is a valuable set of information that may be captured through the use of both a portable device and a software system that stores critical data for the user.

In an additional embodiment, the RTC Protech application may be configured as a portable device for physically challenged individuals to use without much difficulty. For instance, the portable device may be worn or stored within the vehicle to allow elderly individuals to send necessary data to a first communication device. A portable device provides increased options to utilize which helps the user better activate the unit under stressful conditions. It is important to mention that the RTC Protech application can be downloaded to existing wearable and portable devices to accomplish the same goal.

In an exemplary embodiment, the characteristics of the mobile device and other user information associated with the mobile device may be determined and input manually by the user. The key factors of tracking and retrieving data manually will be left solely up to the user. In a non-limiting example, the RTC Protech system may also track trip start and stop time, length of the trip; type of vehicle driven, and weather conditions if necessary at the discretion of the user. This method of collecting data involves the use of existing information that is available to the user for purposes such as interacting with social media groups.

In an exemplary embodiment, RTC Protech application server may utilize the information derived from the places where the user has previously visited for various purposes other than to report brutality. Social media play a powerful role at combating such brutality and so the RTC Protech application has the capability of uploading critical data to social media sites in a way to allow others to share. Social media users will have the ability to allow the public to learn about brutality that would otherwise went unnoticed. The present invention may provide a method of sharing collected data from a trip (e.g., geographic data) may be accessible to family members. The user may also edit a variety of information (e.g., start/stop time, add/delete contacts, and add trip locations). In an exemplary embodiment, the add location feature allows users to draw a box around areas on a map and name locations. When it is necessary for the user to assist the designated contact with determining the user's exact location in order for the contact to accurately locate the user. The system then can provide a report to catalogue the events during the stop. The system may also incorporate a memory cache when entering details that may include the recollection of fields from prior entries.

Turning now to FIG. 1, this figure presents a system diagram for an exemplary system configuration consistent with certain embodiments of the present invention. A system for transmitting collected data 100. A mobile device 108 may be activated by the user within a certain location where information may be initially transmitted to a cloud-based server 114 for use by a mobile device 108. A user 104 may initiate the software system by voice command and tapping the face of a mobile device 108. When the system is initiated, the mobile device 108 sends information data to the application software server 112 through one or more cloud servers 114. The application software server 112 stores the transmitted information data in a data collecting computer 110 which is submitted to a first communication device 116. The application software server 112 also adds an option which allows users 104 to subscribe to see where other police vehicles are located within their proximity. Additionally, data regarding the user's previous locations maybe stored on the application software server 112.

Figure 2:
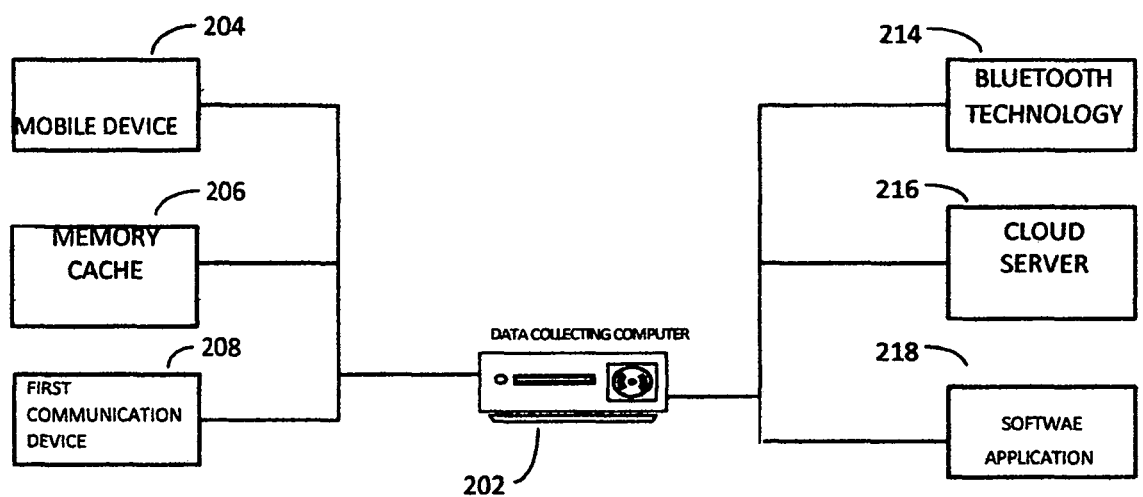
FIG. 2 is a system diagram for initiating a mobile application consistent with certain embodiments of the present invention.

Turning to FIG. 2, this figure presents a system diagram for an exemplary system configuration consistent with certain embodiments of the present invention. This figure presents a diagram for how a mobile device 204 captures data and stores memory in a cache 206 which continuously collects data from the user's location. The collected data is submitted to a memory cache 206 and is maintained by the server 216. The memory cache 206 is an active component of a data collecting computer 202 that communicates with the first communication device 208 that is in possession of a designated contact. Each mobile device 204 may have multiple applications installed on the device 204 based upon preferences. The installed software application 218 to each mobile device 204 is connected to the data collecting for purposes of transmitting vital information to the first communication device 208. The applications 218 do not have to be active for the server 216 to retrieve data, but the device must be operational and manually initiated by the user in order to collect data such as video. The system may retrieve the information for the user and transmit the collected data for the mobile device 204, and information stored for the owner or user of the mobile device 204 to retrieve at a later date.

Figure 3:
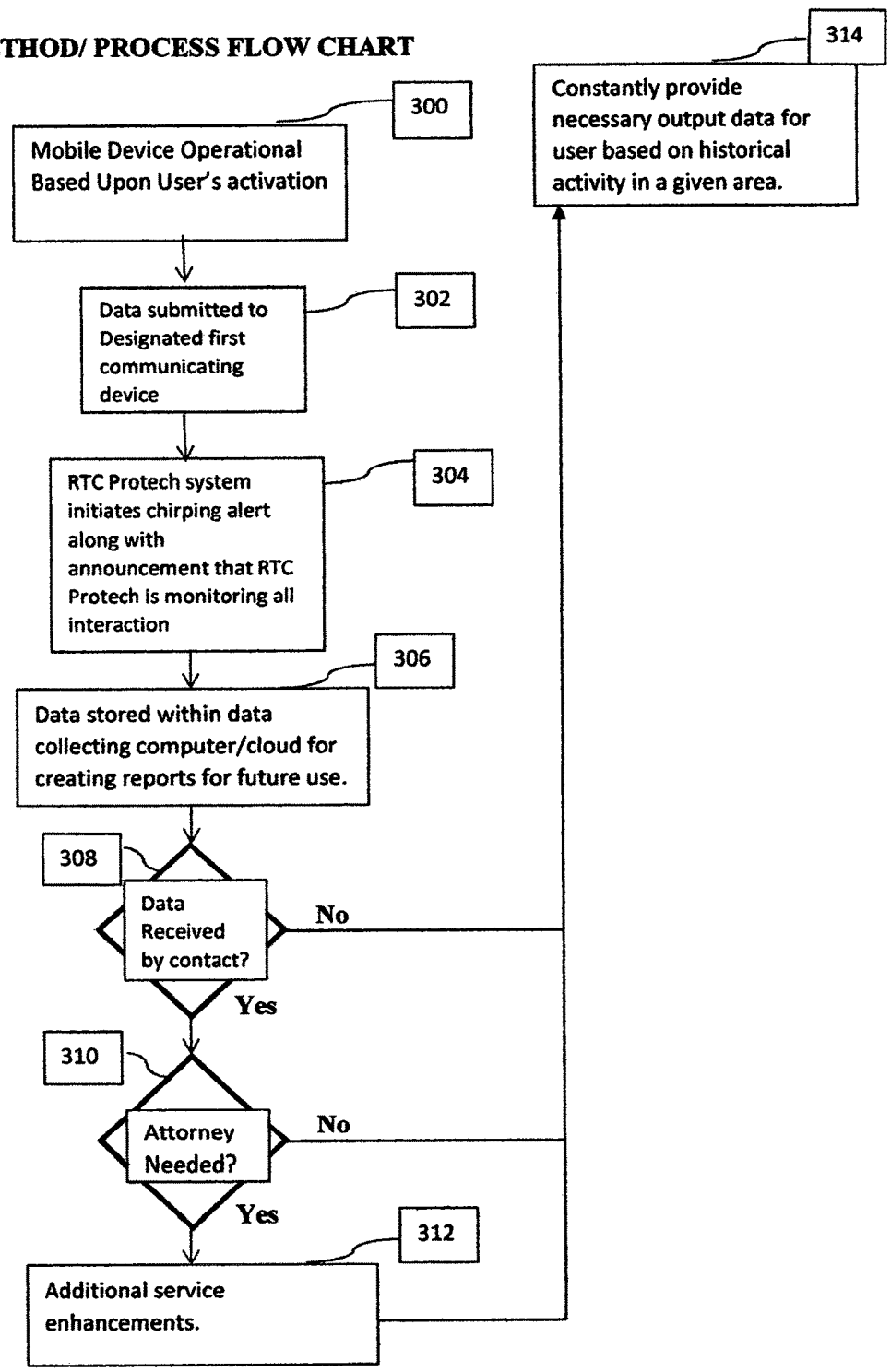
FIG. 3 is a process flow for the determination of critical data for the owner or user of a mobile device consistent with certain embodiments of the present invention.

Turning to FIG. 3, this figure presents a process flow for the determination of certain affiliations of the owner or user of a mobile device consistent with certain embodiments of the present invention. When application software is initiated by the user's tap motion on the face of the mobile device at 300, the application on the mobile device will send collected data to a software application installed on the contact's mobile device. In a non-limiting example, the RTC Protech software system application stored on the mobile device will keep track of all captured data.

At 302, upon a user's selection, the data will be submitted to a first communication device for notification and data analysis. In the event the user does not manually submit the data to a contact, the RTC Protech system will automatically submit data after 15 minutes.

At 304, once the system is activated the RTC Protech system will send a message to the user's mobile device to begin sounding a chirping noise every 30 seconds to alert all in attendance that the system is active. Further the system will also make an audible announcement that the RTC Protech is monitoring the interaction between the officers and the user.

At 306, the RTC Protech system has the capacity to formulate discovery reports by utilizing all of the collected data from the mobile device. As a non-limiting example assume a user and/or the mobile device is activated and properly operating for purposes of creating such discovery reports. Where data is readily available, the software system may be used to collect and draft reports such as discovery documents useful for pending litigation. To illustrate, critical details encountered by the user maybe collected and data such as video, audio, and location information will be recorded as an historical account of events and if allowed by the legal rules of evidence the information may be used in court. The RTC Protech system can also submit data to a cloud-based service such as Microsoft, Facebook, LinkedIn, Amazon, and other such service providers, may receive data regarding the user's shared experiences.

At 308, the designated contact receives a notification from the software application at which point the installed application allows the designated contact to be alerted of the transmitted information. If the information is not properly transmitted to the contact's installed application, then the system will initiate an output data loop after 15 minutes thus prompting another transmission to the designated contact until the information is fully transmitted to the contact.

At 310, the RTC Protech system allows the user to take advantage of several options to ensure that the designated contact is not only receiving critical data but also improving other pertinent data through information collected through previous activities by the user.

At 312, upon a user's request the RTC Protech system offers enhancements that include three different versions for the user that allows for increased tools and options for the vigilant user who wish to stay abreast of critical news and other social media events for example.

At 314, the system will also continually collect datasets from the mobile device such as weather conditions without being prompted by the user. This will allow the RTC Protech system to maintain a multiple approach to data collection. At 314, the system may fully track and maintain all data on the mobile server to allow proper operations and output for the user.

While certain illustrative embodiments have been described, it is evident that many alternatives; modifications, permutations and variations will become apparent to those skilled in the art in light of the foregoing description.

What is claimed is:

1. A system for alerting emergency contacts, comprising:
    a data collecting computer comprising a processor and software, the software when executed by the processor causes the processor to:
    connect to a communication system;
    submit data to a contact;
    receive data from one or more mobile devices, the one or more mobile devices operable to transmit data; wherein when distress data is received, by the data collecting computer, from the at least one mobile device, the data collecting computer communicates to a first communication device, via the communication system, after the processor has initiated communication, the data collecting computer; communicates, via the communication system, to a first communication device; and submits data to the first communication device;
    capture images of a law enforcement officer by utilizing artificial intelligence when prompted by the user, wherein the artificial intelligence uses facial recognition to recognize face of the law enforcement officer; and
    determine speed and location of a vehicle for a report purpose delivered to a relevant authority.

2. The system of alerting emergency contacts according to claim 1; wherein the one or more mobile devices include installed software application.

3. The system of alerting emergency contacts according to claim 2; wherein the software application can be further activated by user voice and touch.

4. The system of alerting emergency contacts according to claim 1; wherein the software application can further cause the mobile device to release a chirping sound every 30 seconds.

5. The system of alerting emergency contacts according to claim 1; wherein the data collecting computer further can receive data from a user's mobile device when the user does not send transmission to contacts once a predetermined time interval has elapsed.

6. The system of alerting emergency contacts according to claim 1; wherein the data collecting computer further comprises a method of storing data.

7. The system of alerting emergency contacts according to claim 1; wherein the software application can be integrated to existing applications on the user's mobile devices.

* * * * *